INVENTORS
Byron N. Baer
Robert S. Rose Jr.

Jan. 30, 1968    R. S. ROSE, JR., ET AL    3,366,299
TENSION MEASURING APPARATUS
Filed Sept. 16, 1965                 6 Sheets-Sheet 3

INVENTORS
Byron N. Baer
Robert S. Rose Jr.
BY

Jan. 30, 1968  R. S. ROSE, JR., ET AL  3,366,299
TENSION MEASURING APPARATUS

Filed Sept. 16, 1965  6 Sheets-Sheet 4

INVENTORS
Byron N. Baer
Robert S. Rose Jr.
BY

Jan. 30, 1968    R. S. ROSE, JR., ET AL    3,366,299
TENSION MEASURING APPARATUS
Filed Sept. 16, 1965    6 Sheets-Sheet 5

INVENTORS
Byron N. Baer
Robert S. Rose Jr.
BY

Jan. 30, 1968   R. S. ROSE, JR., ET AL   3,366,299
TENSION MEASURING APPARATUS

Filed Sept. 16, 1965   6 Sheets-Sheet 6

INVENTORS
Byron N. Baer
Robert S. Rose Jr.
BY
*Edward C. Ifbury*

United States Patent Office 3,366,299
Patented Jan. 30, 1968

3,366,299
TENSION MEASURING APPARATUS
Robert S. Rose, Jr., Westchester, Pa., and Byron N. Baer, Newark, Del., assignors to Atlas Chemical Industries, Inc., Wilmington, Del., a corporation of Delaware
Filed Sept. 16, 1965, Ser. No. 487,871
2 Claims. (Cl. 226—44)

ABSTRACT OF THE DISCLOSURE

An apparatus for regulating and measuring the tension in a segment of running stretchable yarn wherein a constant pretension is placed upon the yarn by continually adjusting the input speed thereof to compensate for changes in the length of yarn as it passes through the apparatus. Successive strain gauges measure the tension in segments of the yarn before and after it passes through a friction producing element to provide a measure of the difference between the pretension applied to the yarn and the total tension applied thereto.

---

This invention relates to tension regulating devices. More particularly, this invention relates to apparatus for controlling and measuring the tension in continuously moving elongated material, such as textiles strands, filaments, yarns and the like.

It is an object of this invention to provide means for exerting and maintaining a controlled degree of tension in continuously moving elongated material.

It is another object of this invention to provide automatic means for regulating the input speed of stretchable running elongated material compensatory to the amount of stretch induced therein.

It is another object of this invention to provide means for measuring tension in continuously moving elongated material.

It is another object of this invention to provide means for accurate measurement of the lubricity of textile yarn finishes and the like.

It is another object of this invention to provide means for measuring the difference in the amount of tension in adjacent segments of continuously moving elongated textile material.

Other objects and attendant advantages of the invention will appear in the following detailed description and from the attached drawings, wherein.

Figure 1:
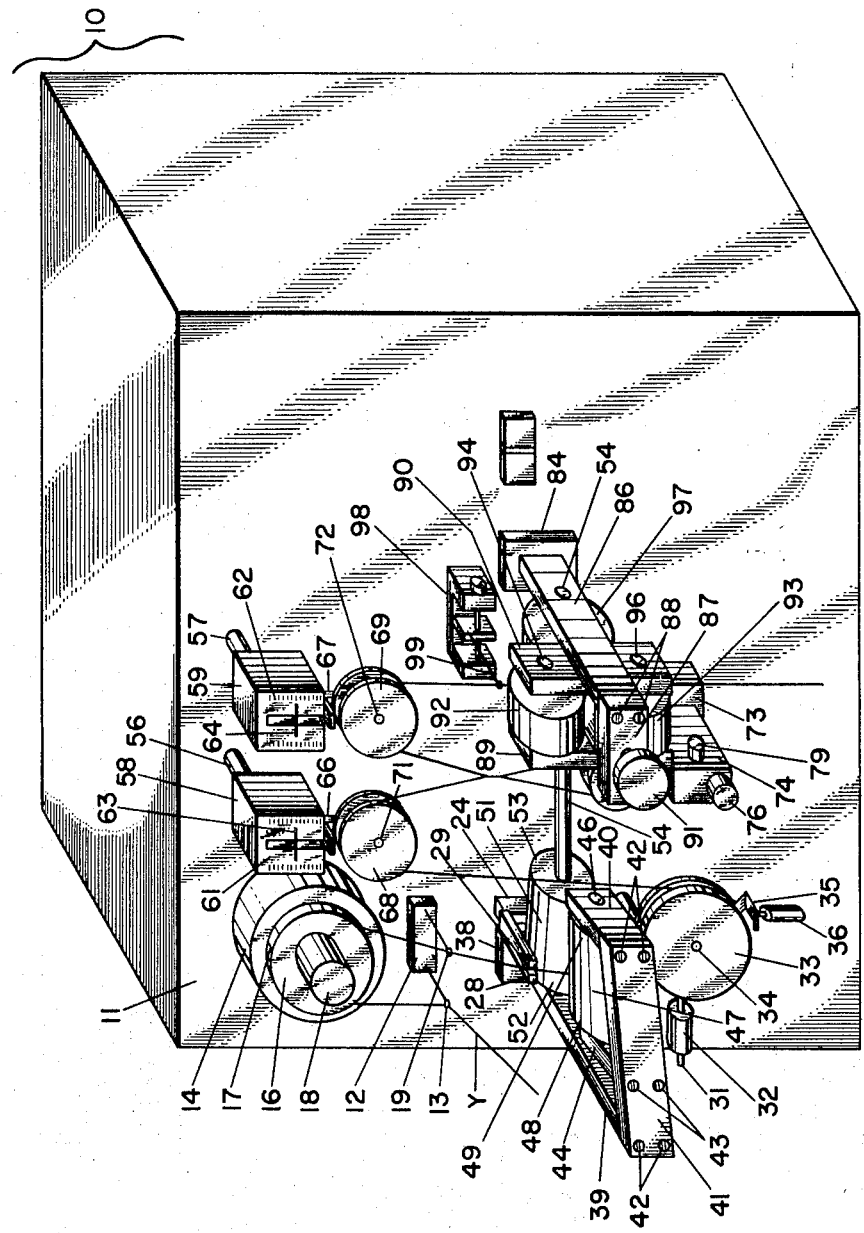
FIG. 1 is an isometric view of a tension measuring device as provided in accordance with this invention.

Adverting herewith to the specific form of the invention illustrated in the drawings, the numeral 10 designates a casing having a front wall 11 to which is mounted a bracket 12 having a guide eye 13 extending perpendicularly therefrom adapted to receive a yarn Y upon the entry thereof into the apparatus. Above bracket 12 there is mounted to wall 11 a hysteresis tension brake 14 having a rotatable wheel 16 which has formed in the periphery thereof a groove 17 for the reception of the yarn Y. A knurled knob 18 forms a part of the tension brake 14 and is adapted for tightening or loosening so as to cause the wheel 16 to turn freely or to drag in order to produce a desired tension on the yarn Y. A second guide eye 19 extends from bracket 12 for the reception of the yarn Y after leaving the grooved wheel 16.

To a stud 21 extending perpendicularly from the front wall 11 of the casing 10 is pivoted by means of pivot pin 22 a flat metal angle bar 23 to which is secured at the pivot point a generally U-shaped member 24 having a rear section 25 extending generally parallel to the front wall 11 of the casing 10 and upper and lower section 26 and 27 extending perpendicularly thereto and outward therefrom. The upper section 26 of the U-shaped member 24 has an extending arm 28 having a guide slot 29 for reception of the yarn Y. Extending from one side of the angle plate 23 is a threaded rod 31 for the reception and support of an interiorly threaded counter weight 32. On the opposite side of the pivot pin 22 there is axially mounted to the angle bar 23 a pretension wheel or pulley 33 on an axial shaft 34. Also secured to the angle bar 23 on the opposite side of the pivot pin 22 from that of the counterweight 32 is a dependent spring-metal hook 35 arranged for the reception of a detachable mass 36. Between the bracket 12 and the stud 21 there is mounted to the front wall 11 another bracket 38 for the support of an outwardly extending frame having sides 39 and 40 extending generally perpendicularly from the front wall 11 of casing 10 and an oblique section 41 connecting the sides 39 and 40 and rigidly secured thereto by means of screws 42 whereby a rigid and immovable frame is formed. Extending from the oblique section 41 of the frame and secured thereto by means of screws 43 is a supporting member 44 which parallels the side 40 of the frame. Extending between the supporting member 44 and the side 40 is a rotatable shaft 46 on which is axially mounted a tapered roll 47 having an end of wider diameter 48 and an opposite end of narrower diameter 49. Adjacent the tapered roll 47 and contiguous therewith is another tapered roll 51 having an end of wider diameter 52 and an opposite end of narrower diameter 53. Tapered roll 51 is mounted on the rotatable shaft 54. Tapered rolls 47 and 51 may be made or rubber or other suitable material conventionally used for that purpose.

Affixed to studs 56 and 57 extending from wall 11 near the top thereof are strain gauges 58 and 59 having faces 61 and 62 which are suitably calibrated so that deflection of the pointers 63 and 64 measures a downward pull upon the pulley members 66 and 67 to which are respectively mounted strain gauge pulleys 68 and 69 on axial shafts 71 and 72.

Figure 2:
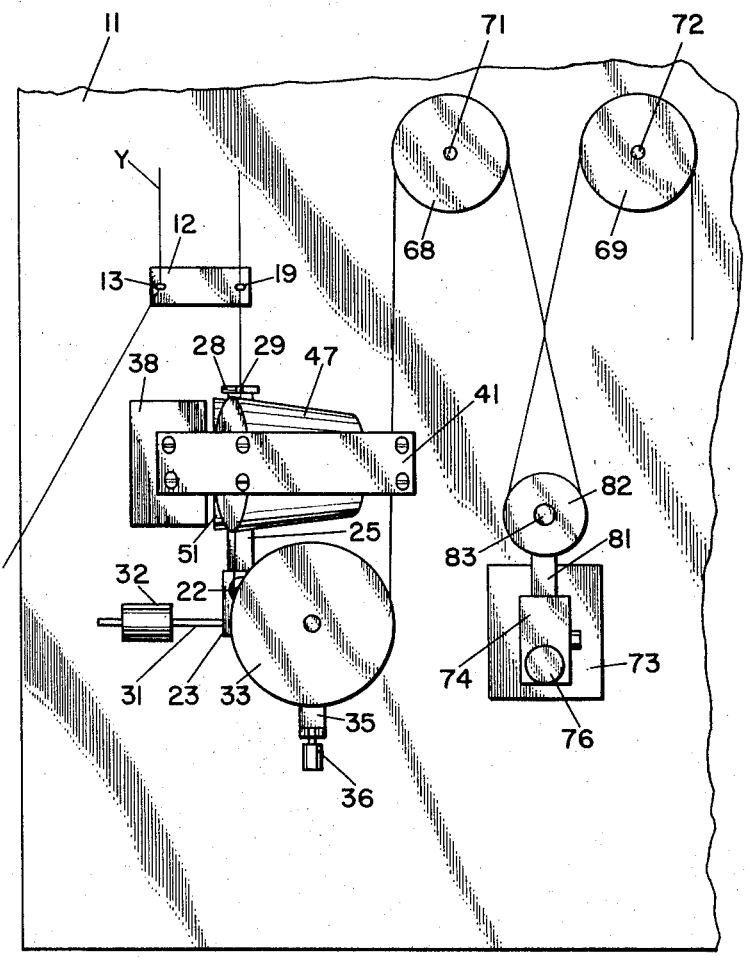
FIG. 2 is a view in front elevation of a part of the tension measuring device showing tension regulating elements thereof in one operating position.
Figure 3:
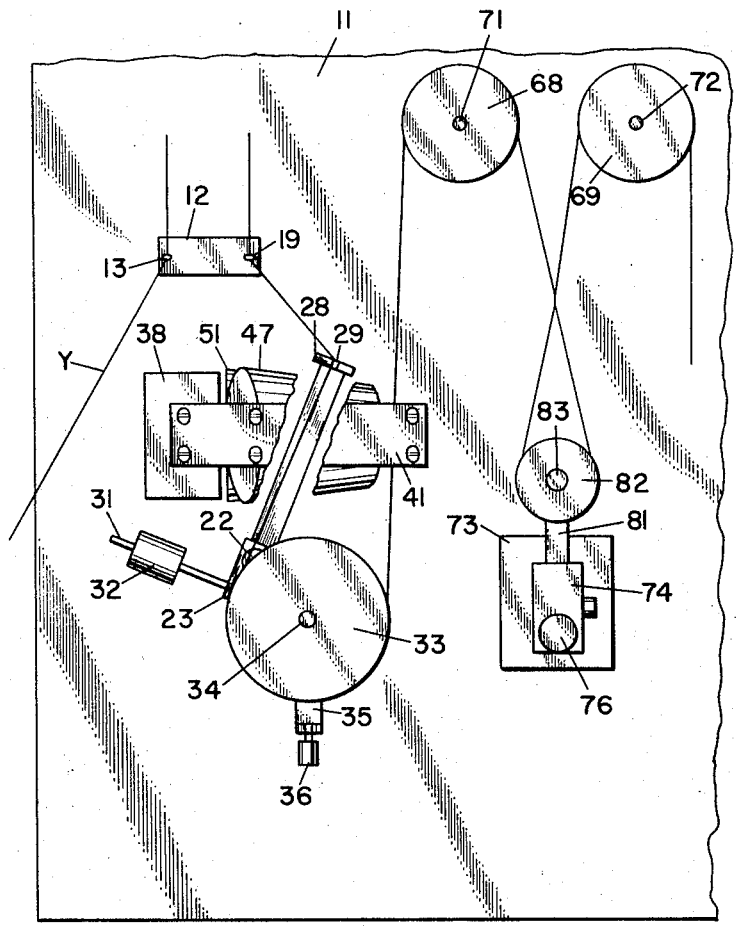
FIG. 3 is a view in front elevation of a part of the tension measuring device showing tension regulating elements thereof in another operative position.
Figure 4:
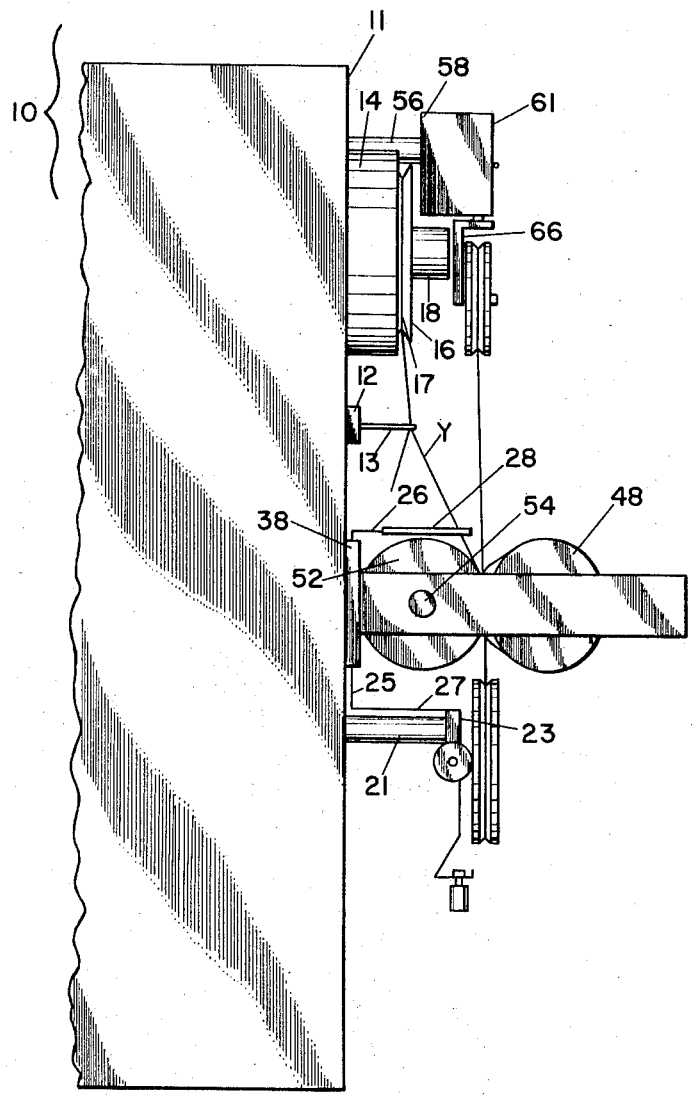
FIG. 4 is a fragmented view in side elevation of the tension measuring device.
Figures 5, 6:
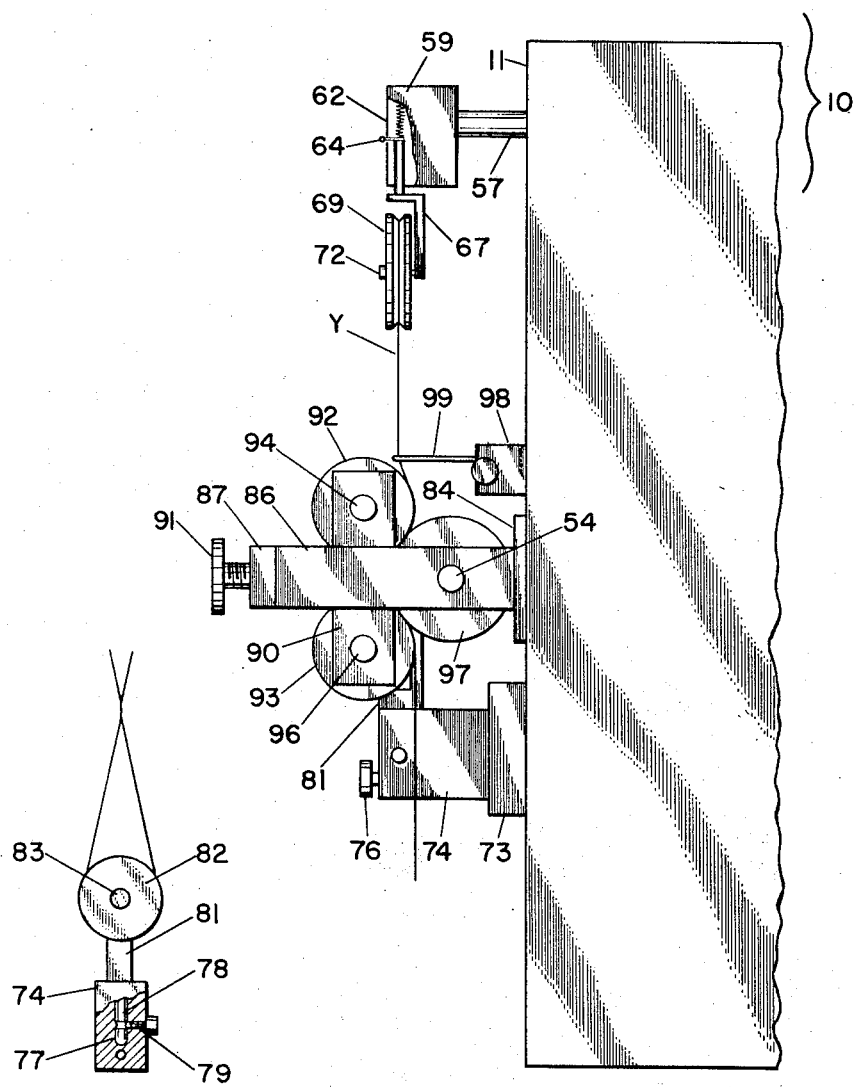
FIG. 5 is a fragmented view in elevation showing the opposite side of the tension measuring device.
FIG. 6 is a view in front elevation, partly broken away, of a friction-producing element of the tension measuring device.

As may be best seen in FIGS. 2 and 3, a bracket 73 is positioned inferiorly to strain gauge pulleys 71 and 72 which is adapted to retain a holder 74 which is tightened to the bracket 73 by means of a thumb screw 76. The holder 74 is provided with a central bore 77 adapted to receive an indented shaft 78 which may be held securely in the holder by means of a threaded thumb screw 79 provided for that purpose. Shaft 78 is connected to a pulley support 81 to which is mounted a friction-inducing pulley 82 on an axial shaft 83. A bracket 84 mounted on the side wall 11 of casing 10 retains a frame having a side section 86 and a front section 87 secured together by screws 88. Bearing plates 89 and 90 are supported within the side sections 86 and 87 by means of a threaded thumb screw 91 which passes through a threaded bore in the front end 87 of the frame. Bearing plates 89 and 90 support cylindrical rubber rolls 92 and 93 on axial shafts 94 and 96 respectively. Inwardly of the rolls 92 and 93 is a metal roll 97 which is contiguous with both of the rolls 92 and 93 and mounted on a shaft 54 one end of which is borne in the side section 86. Mounted to the side wall 11 of the casing 10 superior to the metal roll 97 is a guide eye bracket 98 for the support of guide eyes 99 adapted to receive the yarn Y.

Figure 7:
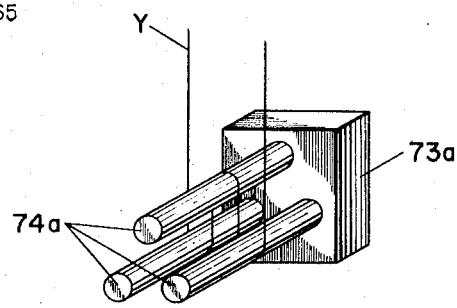
FIG. 7 is a view in perspective of an alternative friction producing element of the tension measuring device.
Figure 8:
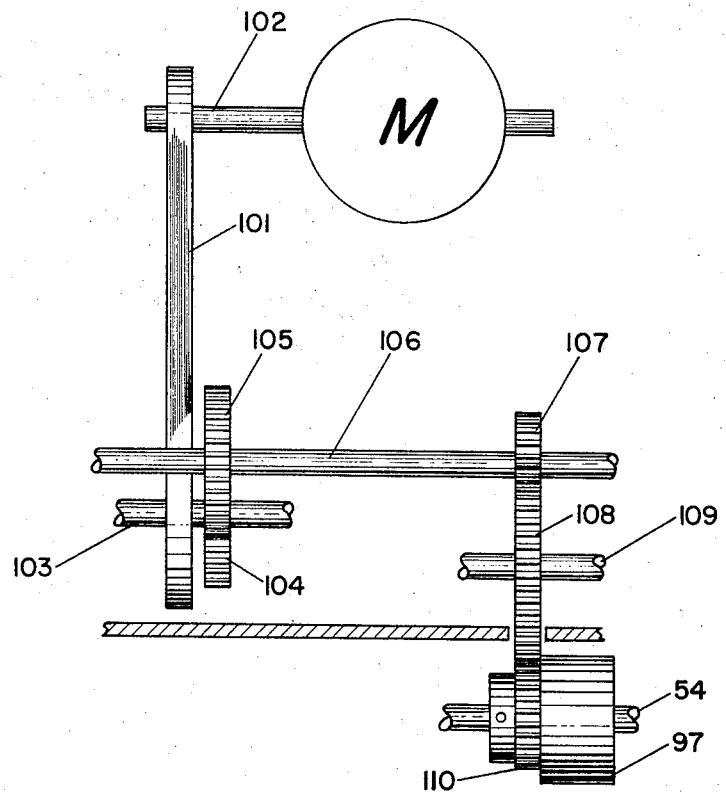
FIG. 8 is a plan view of the drive mechanism of the tension regulating device.

FIG. 7 illustrates an alternative form of friction producing element wherein a bracket 73a is mounted in position on the wall 11 in like manner as bracket 73 and which is provided with extending studs 74a around which the yarn Y may be looped as shown in FIG. 7 to produce friction thereon.

An electric motor M, driven by a suitable source of electric power not shown, is provided by driving the tension regulating and measuring device according to the present invention. A belt 101 encompasses pulleys fixed to a rotatable shaft 102 of the electric motor M and another rotatable shaft 103 which bears a gear 104. The gear 104 engages another gear 105 affixed to a rotatable shaft 106 which bears still another gear 107 arranged for engagement with a gear 108 affixed to a rotatable shaft 109. Gear 108 engages a gear 110 affixed to the drive shaft 54 which rotates rolls 51 and 97 mounted thereon.

In the practice of the present invention, yarn Y is normally threaded through guide eye 13, around the grooved wheel 16 of the tension brake 14 and downwardly through guide eye 19, thence through guide slot 29 of the arm 28 of the U-shaped member 24 after which it is passed downwardly between the tapered rolls 47 and 51 and thence around the pretension pulley 33 and passed upwardly again after which it passes around strain gauge pulley 68. After passing around the strain gauge pulley 68, the yarn Y passes downwardly to pass around the friction-producing pulley 82 then upwardly again to pass around the strain gauge pulley 69, whence the yarn passes downwardly between the metal lead off roll 97 and the rubber lead off rolls 92 and 93 which bear against it. From there, the yarn Y passes out of the apparatus.

When the machine is put into operation, the lead off rolls 92, 93 and 97 pull yarn Y through the device by reason of the rotation of the metal roll 97 upon the shaft 54 which is driven by the motor M through the gear arrangement previously described. Rubber rolls 92 and 93 bear against the metal roll 97 and grip the yarn therebetween so that the yarn moves at a linear speed proportional to the speed of rotation of the shaft 54. Since the tapered roll 51 is also rotated by the shaft 54, the yarn is likewise moved between the tapered rolls 47 and 51 which similarly grip the yarn Y in the nip therebetween. Pretension pulley 33 rests, in effect, on a loop of yarn between the tapered rolls 47 and 51 and the strain gauge pulley 68 and the degree of force or tension which said pulley 33 exerts upon the yarn is proportional to the downward pull exerted by the pully 33, the arm of the angle bar 33 to which it is attached and the mass 36 attached to the hook 35. Any portion of this downward exerting force can be counterbalanced, if desired, by adjusting the counterweight 32 on the threaded rod 31 on the opposite side of the pivot pin 22 which serves as a fulcrum for the angle bar 23. The amount of the downwardly exerted force or tension imposed upon the yarn Y by pretension pulley 33 and the attendant weight 36 will be registered on the strain gauge 58 by means of the pulley 63 which is pulled downward with pulley supporting member 66 as a result of corresponding force exerted by the yarn Y on the strain gauge pulley 68. In order to test the lubricity of the finish or the like which has been applied to the yarn, the yarn may be twisted by rotating the friction producing pulley 82 one or more times as desired. Pulley 82 may be rotated by rotating the shaft 78 in the bore 77 of the holder 74. When the pulley has been rotated as desired, it is secured in position by tightening the screw 79 against the indentation in the shaft 78. Tension produced in the yarn Y by the friction resulting from the yarn rubbing against itself in the twisted segment caused by the rotation of the friction producing pulley 82 will be registered on the strain gauge 59 by means of the pointer 64 attached to the pulley supporting member 67 which moves downward proportionally to the tension of the yarn as a result of the pull exerted by the yarn Y on the strain gauge pulley 69. The amount of tension in the yarn registered by the strain gauge 59 includes the total tension of the yarn produced by the pretension pulley 33 and the twist in the yarn caused by the rotation of the friction producing pulley 82. Accordingly, the reading on the strain gauge 59 is always equal to or greater than the reading on the strain gauge 58.

As the yarn stretches between the friction point and the lead-off rolls, more yarn enters the nip of rolls 47 and 51 than is led off at the nip of rolls 97 and 92 and consequently while passing through the device the pretension pulley 33, which rests on a loop thereof, tends to drop downwardly, thereby moving the angle bar 23 about the pivot pin 22. When this occurs, U-shaped member 24, which is rigidly attached to the angle bar 23, is caused to be deflected as shown in FIG. 3. Deflection of the U-shaped member 24 and the arm 28 thereof moves the yarn in the nip of the tapered rolls 47 and 51 towards the ends of narrower diameter thereof, thereby causing the yarn to be fed into the machine at a slower rate of linear speed to compensate for the amount of stretch which occurs in the yarn. As the amount of stretch varies, the tension pulley 33 will move upwardly or downwardly as the case may be causing arm 28 to move to the left or to the right, thereby adjusting the linear speed of the yarn Y as it enters the machine by reason of the change in position of the yarn Y in the nip of tapered rolls 47 and 51. Accordingly, precise and controlled pretension is maintained upon the yarn Y at all times, thereby eliminating any variable in the measurement of the lubricity of the finish or the like on the yarn, by reason of varying tension in the yarn produced by the tendency of the yarn to stretch in at least some portions thereof.

From the foregoing, it will be evident that it is an important and advantageous feature of the invention as described that the input speed of a stretchable yarn or the like is automatically regulated to compensate for the amount of stretch produced in the yarn as it is run through the tension measuring device. Moreover, by means of such regulation of the speed of input of the yarn, a controlled degree of tension is thereby maintained therein.

Although this invention has been disclosed with reference to specific forms and embodiments thereof, it will be evident that a great number of variations may be made without departing from the spirit and the scope of this invention. For example, parts may be reversed, equivilent elements may be substituted for those specifically disclosed, and certain features of the invention may be used independently of other features, all without departing from the spirit and scope of this invention as defined in the appended claims.

Having thus described our invention, we claim:

1. Apparatus for measuring tension in stretchable running elongated material comprising drive means for moving said material through said apparatus including a pair of tapered nip rolls arranged to receive and continuously grip said material in the nip thereof and another pair of nip rolls spaced apart from said first-mentioned pair of nip rolls and arranged to receive said material after said material passes from said first-mentioned rolls, a material-contacting element disposed in the path of said material intermediate said first- and second-mentioned pair of nip rolls and adapted for producing friction on said material, a force-exerting element disposed in the path of said material in the segment thereof intermedite said material-contacting element and said first-mentioned pair of nip rolls and arranged for displacement upon a change in tension in said segment of said material, a compensating element connected to said force-exerting element and arranged to change the position of said material in the nip of said first-mentoned rolls in correspondence with a displacement of said force-exerting element and means disposed in the path of said material for measuring the difference in tension between the segment of said material between said first-mentioned rolls and said material-contacting means and said second-mentioned rolls and said material contacting means.

2. Apparatus for measuring tension in stretchable running elongated material comprising drive means for moving said material through said apparatus including a pair of tapered nip rolls arranged to receive and continuously grip said material in the nip thereof and a pair of cylindrically shaped nip rolls arranged to receive said material in the nip thereof after said material passes said first-mentioned rolls, a material-contacting element disposed in the path of said material intermediate said first- and second-mentioned pair of nip rolls adapted for producing friction on said material, means disposed in the path of said material for measuring tension on the segment thereof between said material-contacting element and said second-mentioned pair of nip rolls, means disposed in the path of said material for measuring tension therein in the segment thereof between said material contacting element and said first-mentioned pair of nip rolls, a force exerting element disposed in the path of said material in the segment thereof intermediate said second-mentioned tension measuring means and said first-mentioned pair of nip rolls and arranged for displacement upon a change in tension in said segment of said material and a compensating element connected to said force-exerting element and arranged to change the position of said material in said tapered nip rolls in correspondence with a displacement of said force-exerting element.

References Cited
UNITED STATES PATENTS

| | | | |
|---|---|---|---|
| 1,962,029 | 6/1934 | Murphy | 226—184 X |
| 3,209,589 | 10/1965 | Schlatter | 226—34 X |

M. HENSON WOOD, Jr., *Primary Examiner.*

R. A. SCHACHER, *Assistant Examiner.*